United States Patent [19]
Guerinot

[11] Patent Number: 5,386,250
[45] Date of Patent: Jan. 31, 1995

[54] TWO-SOURCE ILLUMINATION SYSTEM

[75] Inventor: William F. Guerinot, Yorktown Heights, N.Y.

[73] Assignee: Philips Electronics North America Corp., New York, N.Y.

[21] Appl. No.: 103,941

[22] Filed: Aug. 9, 1993

[51] Int. Cl.⁶ .............................................. H04N 9/31
[52] U.S. Cl. .................... 348/770; 348/755; 359/230; 359/223; 359/855
[58] Field of Search ............... 359/229, 230, 233, 212, 359/223, 224, 221, 292, 293, 295, 846, 850, 855, 443, 446; 313/465; 358/60, 62, 61, 236, 233, 230; H04N 9/31; 348/755, 744, 757, 764, 766, 761, 770, 771

[56] References Cited

U.S. PATENT DOCUMENTS

| | | | |
|---|---|---|---|
| 4,638,309 | 1/1987 | Granville | 340/752 |
| 4,680,579 | 7/1987 | Granville | 340/783 |
| 4,879,602 | 11/1989 | Glenn | 358/233 |
| 4,969,730 | 11/1990 | van den Brandt | 353/31 |
| 5,096,279 | 3/1992 | Hornbeck et al. | 358/233 |
| 5,097,544 | 3/1992 | Barabas | 5/13 |
| 5,212,555 | 5/1993 | Stoltz | 358/233 |

OTHER PUBLICATIONS

Philips Technical Review, vol. 21, 1969/60, No. 3, pp. 73–108.
Ser. No. 991,216 filed Dec. 16, 1992 (Attorney's Docket No PHA 21,770).
Ser. No. 927,782, filed Aug. 10, 1992 (Attorney's Docket No. PHA 21,648A).

Primary Examiner—James J. Groody
Assistant Examiner—Glenton B. Burgess
Attorney, Agent, or Firm—John C. Fox

[57] ABSTRACT

A two-source illumination system includes a reflective array of elements deflectable to first and second positions in response to a drive voltage, and two sources pointed at the array from different angles, so that upon cycling the elements rapidly back and forth between the two positions, and alternately cycling the sources between on and off conditions synchronously with the cycling of the reflective array, light from both sources is (alternately) reflected back along an axis normal to the array. This arrangement allows driving the sources at a higher power level, resulting in a higher total light output from the system than would be possible with a single source driven constantly at a lower power level.

12 Claims, 4 Drawing Sheets

TWO-SOURCE ILLUMINATION SYSTEM

BACKGROUND OF THE INVENTION

This invention relates to illumination systems, and more particularly relates to a two-source illumination system having a high light output.

Light emitted from illumination systems can be modulated by an array of picture elements or pixels whose transmittance or reflectance can be changed in response to an electrical signal, thus creating a display. The modulating array is sometimes referred to as a light valve.

In light valve projection systems, such as those employing LCD panels as light valves, the typical acceptance angle needed to provide an adequate level of display contrast is on the order of plus or minus 15 degrees. In projection systems which are proposed to employ DMD (deformable micromirrored device) panels as light valves, the acceptance angle is even narrower, for example, on the order of plus or minus 10 degrees. Collecting a high percentage of light from a light source over such a restricted collection angle has proven to be difficult in practice.

Light sources which have the combination of small arcs (on the order of 1 to 2 mm in length), high values of luminous efficacy and/or the ability to be driven at high power levels would seem to be the best suited for these demanding applications. However, only two known types of lamps come close to meeting these requirements; a 500 watt xenon arc lamp and a 100 watt high pressure discharge lamp. Both lamps have a small arc of about 1 mm. However, the xenon lamp has a relatively poor luminous efficacy of around 25 lumens per watt, while the high pressure lamp, although it has a somewhat higher luminous efficacy of about 60 lumens per watt, still cannon provide sufficient output to achieve the required brightness levels in the current projection systems employing DMD light valves.

OBJECTS AND SUMMARY OF THE INVENTION

Accordingly, it is an object of the invention to provide an illumination system which has a relatively high light output.

It is another object of the invention to provide such an illumination system which is suitable for use with light valve projection systems.

It is another object of the invention to provide such a system which has a relatively high light output within a relatively narrow acceptance angle.

In accordance with the invention, a two-source illumination system includes: a DMD (digital micromirrored device) having a planar array of reflective deflection elements, the elements deflectable to first and second positions in response to first and second drive voltages; means for causing the elements to cycle periodically between the first and second positions; first and second illumination sources for illuminating the DMD when the elements are in the first and second positions, respectively; as well as means for alternately driving the sources synchronously with the drive means, so that the first source is on when the elements are in the first position and the second source is on when the elements are in the second position.

The DMD drive electrodes are specially configured so that all elements of the array are deflected simultaneously in one direction upon application of the first drive voltage, and deflected simultaneously in the other direction upon application of the second drive voltage. Each source is arranged at an angle to an axis normal to the plane of the array, such that the illumination beams incident on the reflective surface of the DMD are both reflected back between the two sources along the DMD axis. By illuminating the array with the first source when the elements are in the first. position, and illuminating the array with the second source when the elements are in the second position, the light reflected from the array is a combination of the light from both sources.

An advantage of using a DMD reflective array instead of a single reflective element is that the response time of such an array can be very fast, for example, on the order of 10 microseconds, which allows a switching speed more than sufficient to avoid flicker (visual perception of the switching) and/or periodic drop-out artifacts (perception of the failure of individual elements to deflect).

Certain high pressure lamps can have response times as short as 10 microseconds, which is also adequate to avoid flicker and/or drop-out artifacts. A principal advantage of the above arrangement is that the cycling on and off of these high pressure lamps enables driving the lamps at high peak power levels, well above their average power rating, for example at twice their power rating, without appreciably affecting their operating life. Thus, the instantaneous luminous efficacy of each source, and thus the total luminous efficacy of the system, can be nearly doubled when compared to the output of a single source.

Pulsing of high pressure lamp illumination sources to increase light output is known per se. See for example, Philips Technical Review, Vol. 21, 1959/60, No. 3, pp. 73–108. However, the illumination system of the invention allows a near doubling of light output without flicker or drop-out artifacts and without appreciably affecting lamp operating life.

Such an illumination system is particularly useful in projection systems employing light valves having a restricted collection angle, such as LCDs and DMDs.

DESCRIPTION OF THE PREFERRED EMBODIMENTS

Figure 1:
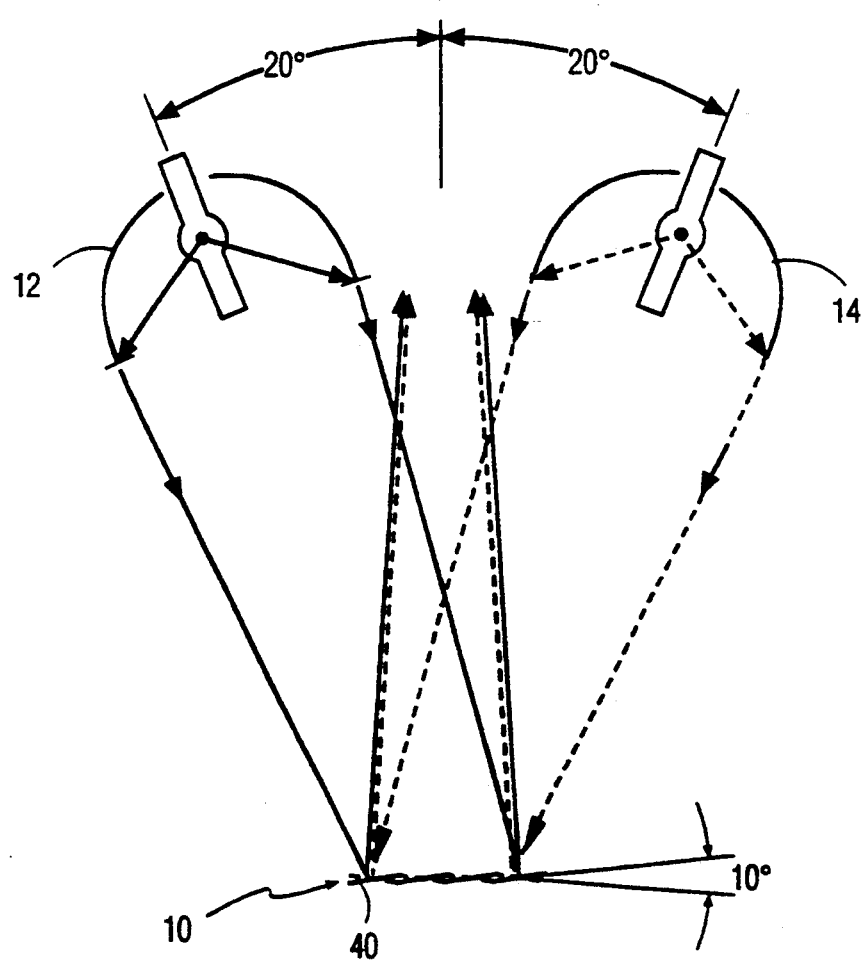
FIG. 1 is a schematic layout of an illumination system of the invention, including a DMD and two illumination sources.

Referring now to FIG. 1, there is shown a schematic representation of an illumination system of the invention, employing a DMD reflective array 10 and two high pressure discharge lamps, 12 and 14. The DMD is a solid state device fabricated from a single piece of silicon, and comprises a matrix array of deformable micromirror elements, each of which can be made to tilt in response to an applied voltage.

In a known application of the DMD, a matrix of electrodes arranged in rows and columns is used to make individual mirror elements tilt in response to a video signal, to direct reflected light into or out of an optical projection system, and thereby recreate the video image for projection. See, for example, U.S. Pat. Nos. 4,638,309; 4,680,579; and 5,097,544.

However, in accordance with the present invention, the matrix of electrodes is arranged so that all of the elements in the array are tilted in one direction upon application of a drive voltage, and tilted in another direction upon application of another drive voltage. For example, in the arrangement shown in plan view in FIG. 4, pad electrodes A and B located under opposing sides of each element 40 are each connected to the adjacent row and column electrodes, respectively. All of the row electrodes are connected together and subjected to a drive voltage $V_{DMD1}$. In turn, all of the column electrodes are connected together and subjected to a drive voltage $V_{DMD2}$. In addition, the elements are interconnected and subjected to a bias voltage or grounded. By using a simple multiplex switch, not shown, the array can be continuously cycled between the first and second positions, in accordance with, for example, a 50 per cent duty cycle.

Referring again to FIG. 1, array 10 is shown in elevation view, with the elements 40 shown tilted in the first position and (in phantom) in the second position. Lamps 12 and 14 are positioned off-axis to illuminate the elements from different directions. In order that the reflected beams from both lamps propagate back between the lamps along the same axis, the lamps should be positioned so that the illumination beam paths make an angle with the axis approximately twice the angle of deflection of the elements from the plane of the array. In this example, the deflection angle of the elements is approximately 10 degrees, and the angle between the illumination beams and the axis is about 20 degrees.

Figure 2:
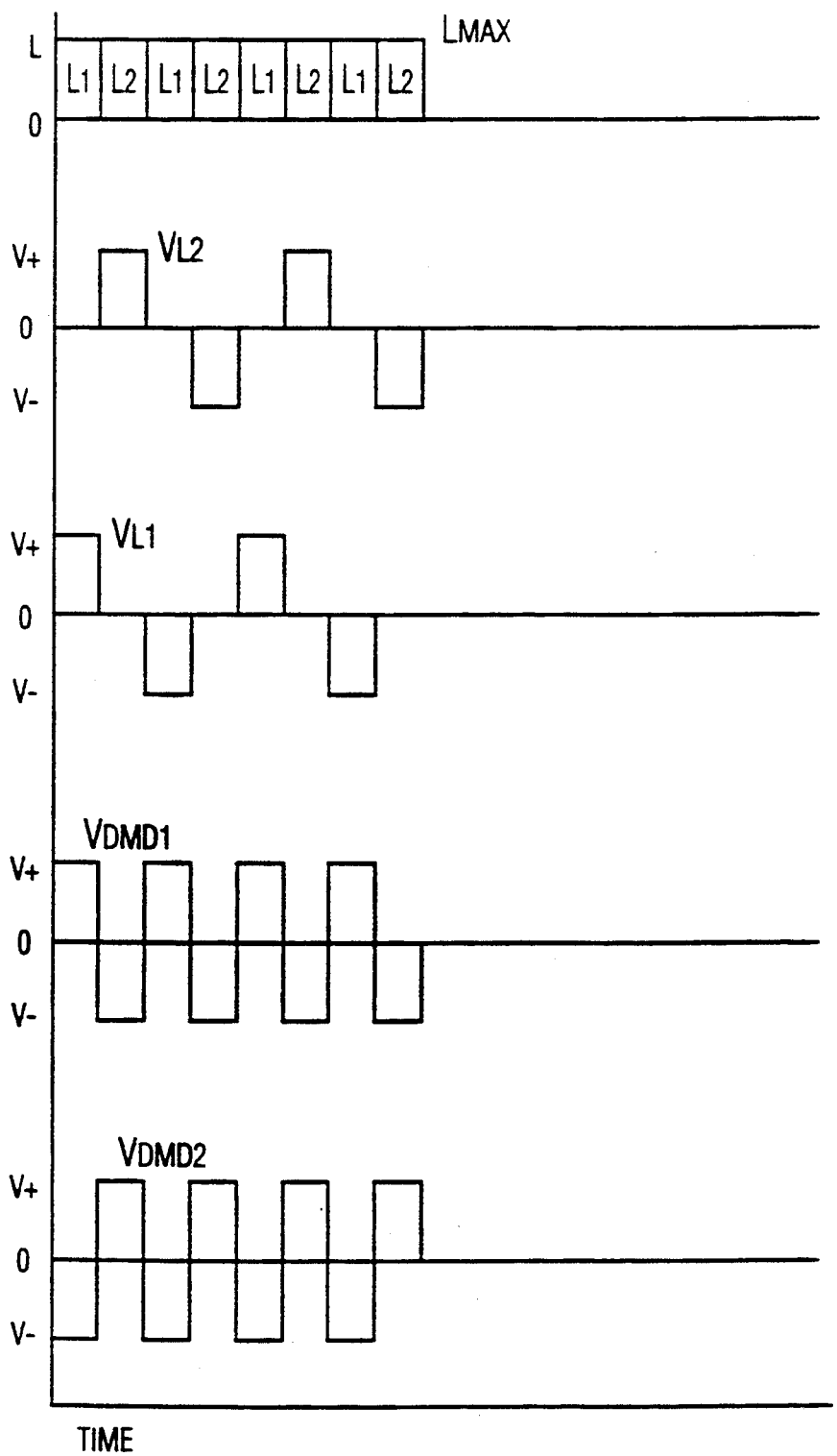
FIG. 2 is a graphical representation of a simple 50 percent duty cycle for synchronously driving a DMD array and two high pressure lamp illumination sources in the arrangement of FIG. 1.

FIG. 2 is a graphical representation of one way of operating the illumination system of the invention, using a 50 percent duty cycle to drive the DMD array, represented by bar graphs (a) and (b), in which drive voltages $V_{DMD1}$ and $V_{DMD2}$ alternate in polarity, both of equal amplitude (for example, 20 volts) and duration (for example, about 1/360 second, corresponding to twice the color field rate for a three color sequential system).

Bar graphs (c) and (d) represent the duty cycles for the first and second lamps, respectively, in which drive voltages $V_{L1}$ and $V_{L2}$ each have a 50 percent duty cycle, with each voltage pulse 180 degrees out of phase with the previous pulse, respectively. In addition, $V_{L1}$ and $V_{L2}$ pulses alternate with each other, so that $V_{L1}$ corresponds in time with $V_{DMD1}$ and $V_{L2}$ corresponds in time with $V_{DMD2}$. The light output of the system is represented by bar graph (e), in which light output from the first and second lamps, $L_1$ and $L_2$, respectively, alternate to result in an effectively continuous light output from the system.

Figure 3:
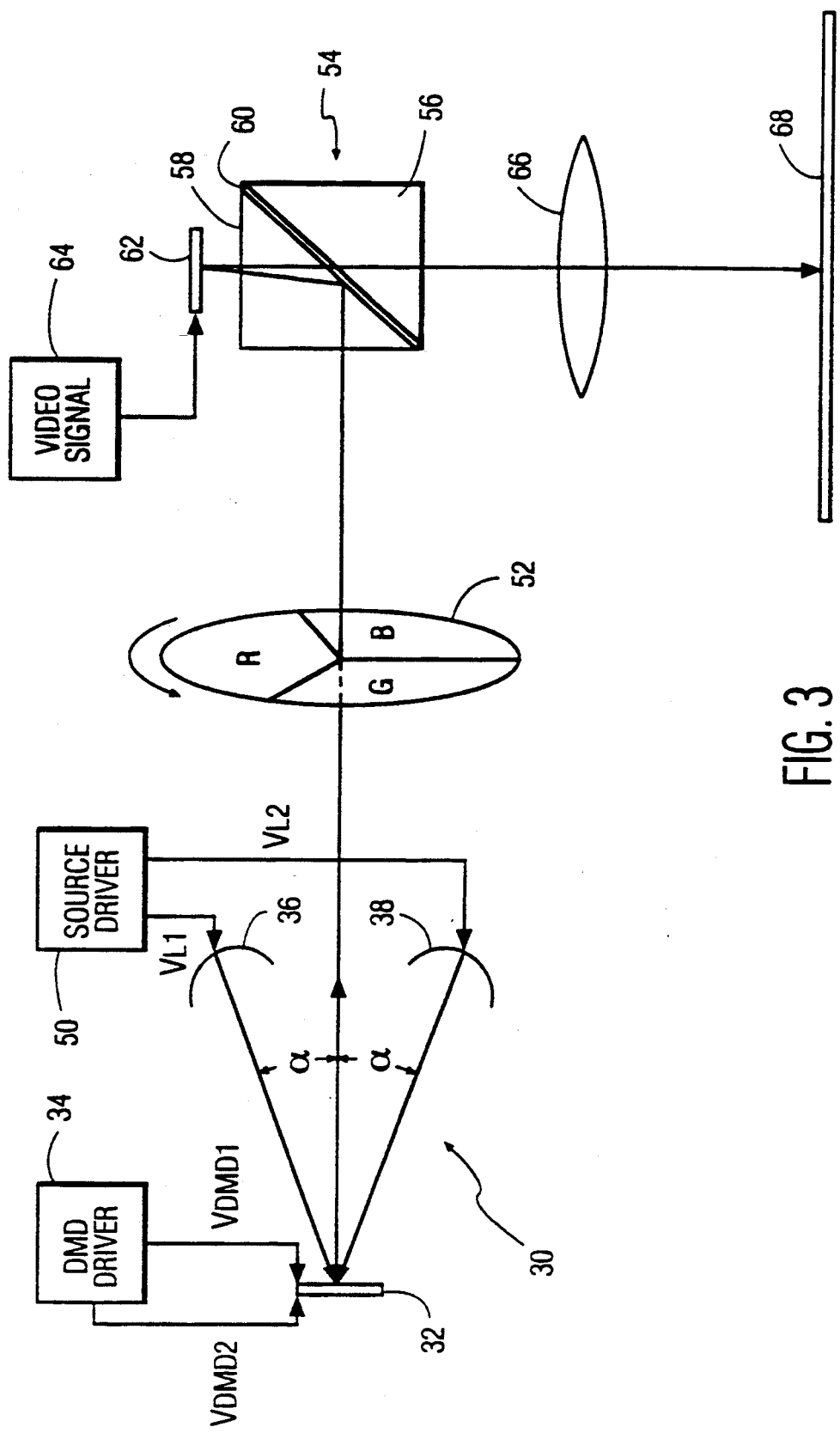
FIG. 3 is a schematic layout of a color sequential projection system using a DMD light valve and an illumination system of the type shown in FIG. 1.
Figure 4:
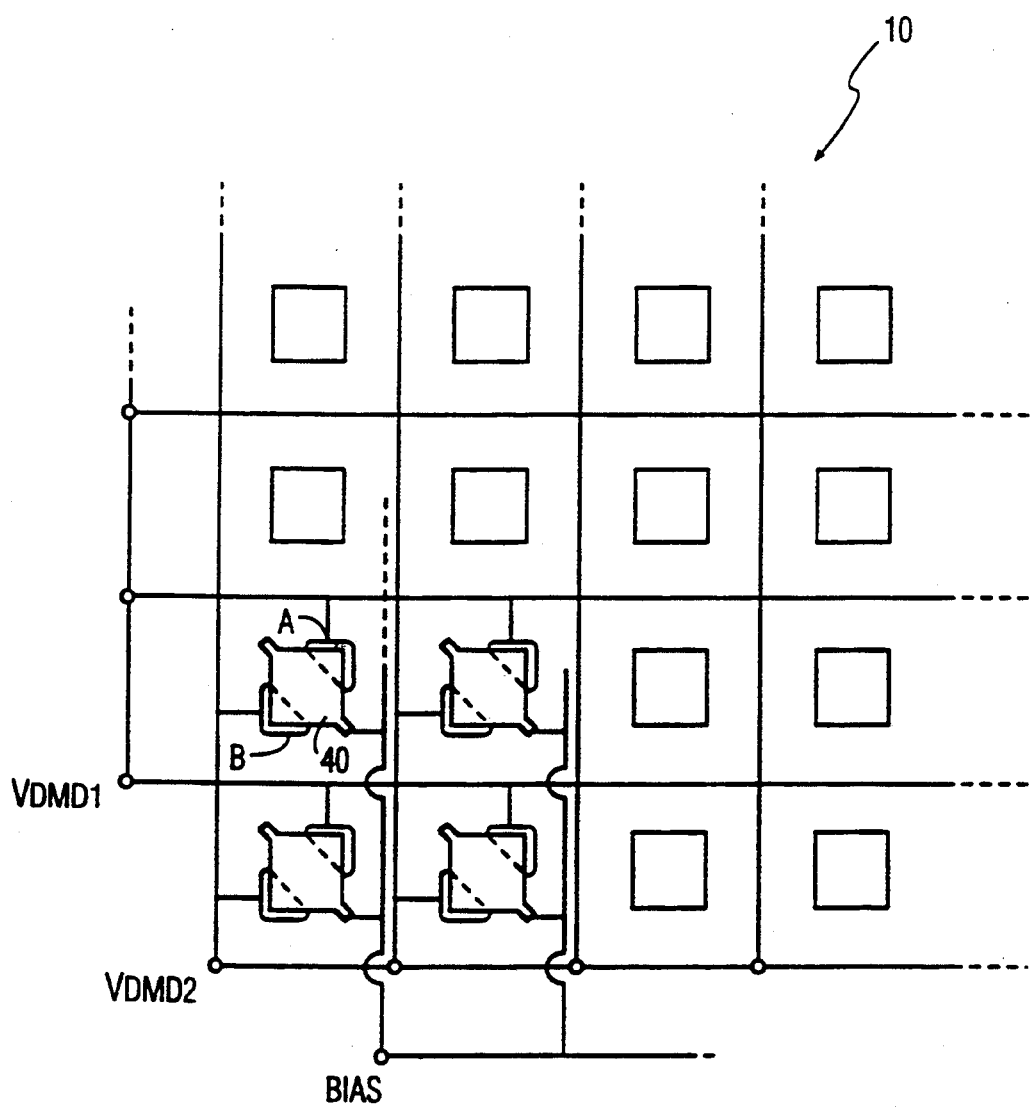
FIG. 4 is a schematic wiring diagram of a DMD element array suitable for use in the invention.

FIG. 3 is a schematic layout of a color television projection system employing an illumination system of the invention. Illumination system 30 includes DMD reflective array 32, with the array interconnected as shown in FIG. 4, that is, with the deflection electrodes A and B connected to the row and column electrodes, respectively, which are in turn connected to drive voltages $V_{DMD1}$ and $V_{DMD2}$, respectively, supplied alternately by DMD driver 34. High pressure discharge lamps 36 and 38 are in turn driven alternately by drive voltages $V_{L1}$ and $V_{L2}$ from source driver 50 in synchronism with DMD driver 34, in the manner shown in FIG. 2. Lamp sources 36 and 38 are arranged off-axis to illuminate DMD array 32 at an angle alpha, which is twice the angle of deflection of the DMD elements from the plane of the array, so that both illumination beams are reflected back along the axis of DMD 32, through a rotating color wheel 52.

Color wheel 52 is a transmissive filter having three segments, one for each of the primary colors red, blue and green, so that upon rotation of the wheel, the light from illumination source 30 is sequentially filtered through the red, blue and green filter segments. This filtered light passes into prism 58 of prism illuminator 54, where it is reflected at air gap 60 by total internal reflection to impinge on DMD light valve 62. Unlike DMD array 32 in the illumination source 30, DMD light valve 62 is fabricated in such a manner that each of the deflection elements is individually addressable. In operation, the DMD light valve array is addressed sequentially with red, blue and green video signals from video signal source 64 synchronously with the impingement of the red, blue and green filtered light on the array, to thereby build up a video display image on the array.

The light reflected from the DMD light valve elements of array 62 in the "on" position reenters prism 58 and passes out of prism illuminator 54 through air gap 60 and prism 56.

Such a prism illuminator and its use in an optical system are known, for example, from U.S. Pat. 4,969,730, issued to A. H. J. van den Brandt.

A full color projection system utilizing three DMDs, each illuminated by a separate prism illuminator, is described and claimed in copending U.S. patent application Ser. No. 991,216, filed Dec. 16, 1992 (Attorney's Docket No. PHA 21,770) and assigned to the present assignee.

From prism illuminator 54, the image embodied in the reflected light enters projection lens 66, where it is magnified and projected onto display screen 68.

Light reflected from the elements of array 62 in the "off" position are reflected out of the optical system.

The invention has necessarily been described in terms of a limited number of preferred embodiments. Other embodiments and variations of embodiments will become apparent to the skilled artisan, and are thus intended to be encompassed within the scope of the appended claims. For example, in addition to high pressure discharge lamps, other illumination sources having rapid response times can be employed, such as lasers.

In addition to the color sequential video projection system described, the illumination system of the invention may be employed in other color sequential systems, such as the single panel projector with rotating prism of copending U.S. patent application Ser. No. 927,782, filed Aug. 10, 1992 (Attorney's Docket No. PHA 21,648A) and assigned to the present assignee; as well as other color or monochrome projection display systems, such as the three panel color system of Ser. No. 991,216, already referred to above.

Also, the illumination system of the invention is useful in other optical systems, particularly those having a narrow acceptance angle, such as fiber optic or other light pipe systems.

What is claimed is:

1. A two-source illumination system comprising:

(a) a DMD (deformable micromirror device) having a planar array reflective deflection elements, and an axis normal to the plane of the array, the elements being deflectable to a first position in response to a first drive voltage, and being deflectable to a second position in response to a second drive voltage;

(b) voltage drive means for causing the elements to cycle periodically between the first and second positions;

(c) a first illumination source in a first off-axis position for illuminating the DMD when the elements are in the first position;

(d) a second illumination source in a second off-axis position for illuminating the DMD when the elements are in the second position; and;

(e) means for alternately illuminating the sources synchronously with the drive means so that the first source is on when the elements are in the first position and the second source is on when the elements are in the second position, whereby illumination reflected from the DMD is a combination of illumination from both sources.

2. The illumination system of claim 1 in which the sources are high pressure discharge lamps.

3. The illumination system of claim 1 in which the angle of deflection of the elements from the plane of the array in the first and second positions is about 10 degrees.

4. The illumination system of claim 3 in which the angle between the DMD axis and the beam axes of the illumination sources is about 20 degrees.

5. The illumination system of claim 1 in combination with a projection system comprising at least one light valve, means for addressing the light valve with a display signal, and at least one projection lens, the light valve positioned to reflect illumination from the illumination system into the projection lens, whereby a display image formed in accordance with the display signal is projected by the projection lens.

6. The illumination system of claim 5 in which the projection system is a color sequential television projection system, in which: the light valve is a DMD having a planar array of reflective deflection elements, the elements being individually addressable in response to a video signal; means are provided for sequentially illuminating the DMD with light of the three primary colors red, blue and green; the addressing means includes means for sequentially addressing the DMD with red, blue and green video signals synchronously with illumination of the DMD with the corresponding color of illumination.

7. The illumination system of claim 6 in which a projection display screen is located in front of the projection lens.

8. The illumination system of claim 6 in which the means for sequentially illuminating the DMID with light of the three prima colors comprises a rotatable color wheel.

9. The illumination system of claim 6 in which a prism illuminator is located between the DMD light valve and the projection lens.

10. A DMD comprising a two dimensional array (10) of reflective deflection elements (40), a pair of deflection electrodes (A, B) associated with each deflection element (40), and a matrix of row and column electrodes associated with the deflection electrodes (A, B), characterized in that one electrode (A) of each pair of deflection electrodes is directly connected to a row electrode, the other electrode (B) of each pair of deflection electrodes is directly connected to a column electrode, the row electrodes are interconnected, and the column electrodes are interconnected, so that upon application of a drive voltage to the row electrodes or to the column electrodes, all of the deflection elements of the array are deflected to a first or second deflection position, respectively; and the deflection elements are held at a bias potential or grounded.

11. The illumination system of claim 5 in which the light valve is a DMD.

12. The illumination system of claim 5 in which the light valve is an LCD.

* * * * *